United States Patent [19]

Wygnanski

[11] Patent Number: 5,209,438
[45] Date of Patent: May 11, 1993

[54] METHOD AND APPARATUS FOR DELAYING THE SEPARATION OF FLOW FROM A SOLID SURFACE

[76] Inventor: Israel Wygnanski, 4559 N. Placita de las Charcras, Tucson, Ariz. 85718

[21] Appl. No.: 208,529

[22] Filed: Jun. 20, 1988

[51] Int. Cl.$^5$ .................. B64C 21/00; B64C 23/00
[52] U.S. Cl. .................... 244/203; 244/199; 244/204
[58] Field of Search .............. 244/204, 206, 213–215, 244/216, 130, 199, 201, 203

[56] References Cited

U.S. PATENT DOCUMENTS

| | | | |
|---|---|---|---|
| 3,130,943 | 4/1964 | Berresham et al. | 244/213 |
| 3,362,663 | 1/1968 | Wehrmann | 244/130 |
| 3,774,867 | 11/1973 | Quinn | 244/130 |
| 4,257,224 | 3/1981 | Wygnanski et al. | 60/204 |
| 4,516,747 | 5/1985 | Lurz | 244/130 |
| 4,697,769 | 10/1987 | Blackwelder et al. | 244/179 |
| 4,741,498 | 5/1988 | Gerhardt | 244/204 |
| 4,802,642 | 2/1989 | Mangiarotty | 244/204 |

FOREIGN PATENT DOCUMENTS

| | | | |
|---|---|---|---|
| 106662 | 2/1943 | Sweden | 244/206 |
| 233083 | 5/1925 | United Kingdom | 244/206 |

Primary Examiner—Galen Barefoot
Attorney, Agent, or Firm—Benjamin J. Barish

[57] ABSTRACT

An active perturbation-producing element on the solid surface is driven to induce oscillations in the boundary layer of the fluid stream about an axis substantially perpendicular to the solid surface, to enhance the mixing of the boundary layer in the fluid stream. The method is particularly applicable for increasing the lift of a wing, but may also be used for increasing the divergence angle of a diffuser.

20 Claims, 10 Drawing Sheets

METHOD AND APPARATUS FOR DELAYING THE SEPARATION OF FLOW FROM A SOLID SURFACE

BACKGROUND OF THE INVENTION

The present invention relates to a method and apparatus for delaying the separation of a boundary layer flowing over a solid surface to higher adverse pressure gradients associated with larger divergence of the flow. The invention is especially applicable to wings, for increasing the maximum angle of attack and thereby the lift of the wing, and is therefore described below particularly with respect to this application. The invention, however, may be advantageously used in other applications, for example in diffusers, in order to increase the permissible angle of divergence of the diffuser for the purpose of slowing the fluid flow and recovering pressure.

The loss of lift, commonly referred to in the literature as "stall", results from the separation of the boundary layer in the airstream flowing over the wing as a result of an adverse-pressure gradient which cannot be negotiated by the boundary layer. Such a separation is induced by an increase in the angle of attack of the wing above a predetermined maximum, and limits the maximum lift of a wing of given dimensions.

A similar separation of the boundary layer occurs in diffusers having an enlargement for slowing the fluid flow and recovering pressure. Thus, the angle of the diffuser surface at the enlargement is limited, typically to a 60 equivalent conical angle, in order to prevent separation of the boundary layer.

OBJECTS AND SUMMARY OF THE INVENTION

A broad object of the present invention is to provide a method and apparatus for delaying the separation of a boundary layer of a fluid stream flowing over a solid surface to higher adverse pressure gradients associated with larger divergence of the flow.

According to the present invention, there is provided an active method of delaying the separation of the flow from a solid surface to higher angles of divergence or incidence characterized in that a perturbation-producing element on the solid surface is driven by an active drive at a predetermined frequency, dependent on the air stream velocity but independent of the fluctuations existing locally in the flow, to induce travelling oscillations in the boundary layer of the fluid stream substantially perpendicular to the solid surface to enhance mixing of the boundary layer with the fluid stream outside the boundary layer.

The invention is particularly applicable for increasing the lift of a wing. It is believed that the above method accomplishes this according to the following mechanism of action:

The boundary layer on the upper surface of a wing thickens initially with increasing "$\alpha$" (angle of attack), while remaining fully attached to the surface, in spite of the growing adverse pressure gradient. Large coherent structures, similar to the ones observed in a free mixing layer (see U.S. Pat. No. 4,257,224, discussed below) appear to straddle the entire width of the boundary layer at these angles of attack. The lift coefficient increases almost linearly with "$\alpha$".

As the angle of attack approaches its maximum value and is increased further, the boundary layer separates. Separation may occur near the leading edge of the wing, enclosing a large-scale bubble whose length is commensurate with the airfoil chord; but separation may also start near the trailing edge and creep upstream with increasing incidence. The location at which the flow starts to separate depends on the geometry of the air foil. The lift coefficient initially continues to increase and, in some instances, even the slope of the lift curve ($dC_L/d\alpha$) increases because of the growth of the bubble which effectively changes the camber and the thickness of the airfoil. However, as the angle of attack increases further, the separated mixing layer fails to reattach to the surface. The direction of the flow over the wing surface is reversed. This reverse flow is entrained into the mixing layer which increases in width and degree of unsteadiness with increasing "$\alpha$".

The shear layer existing above the wing is inviscidly unstable and generates its own eddies, whose scale is commensurate with the local characteristic thickness of the boundary layer at separation. Thus, the mixing layer consists of an array of Kelvin-Helmholtz eddies which meander as a result of a secondary instability. The stalled flow may therefore be viewed as a contorted mixing layer.

A deep stall may be viewed as a sudden change in the inclination angle of the shear layer relative to the free stream; i.e., the shear layer, which is approximately inclined to the free stream at the angle of incidence of the wing while the flow is attached, becomes parallel to the free stream when the wing stalls. The detachment of the shear layer can therefore be delayed to higher angles of attack by increasing its characteristic width, i.e., the scale of the eddies generated by the Kelvin-Helmholtz instability. The change in the size of these eddies implies a change in the rate of entrainment into the separated shear layer. When the entrained fluid comes from the limited reservoir bounded by the separated shear layer and the solid upper surface of the wing, the pressure in this reservoir is reduced, causing the separated shear layer to bend toward the surface to provide the required balance between the curvature of the flow and the pressure gradient in the direction perpendicular to the streamlines. This bending of the mixing layer causes it to reattach to the surface and to restore the lift generated by the wing. This delays the occurrence of stall and thereby increases the maximum lift.

Reference was made above to U.S. Pat. No. 4,257,224, which issued Mar. 24, 1981, and of which I am one of the joint inventors. This patent describes a method, and various means that may be used, for enhancing mixing of two fluids, e.g., for promoting combustion or other chemical reactions, suppressing audible jet noise, or increasing the output of ejector pumps. The technique described in that patent introduced relatively small oscillations or perturbations to which the mean flow is inherently unstable, rather than pulsating the entire stream which would require a very large quantity of energy. The instability of the mean flow amplifies this perturbation, resulting in enhanced entrainment and mixing.

The method and apparatus of the present invention thus exploit the technique of mixing described in the above patent, for delaying the separation of a boundary layer of a fluid flowing over a solid surface, and may use any of the active drive means specifically described in that patent for producing the oscillations, including pivotal flaps, vibrating ribbons, injected fluid jets rotating nozzles, rotors, etc. Other active drive means, not specifically described in that patent, but usable in the method of the present application for producing the oscillations, include magnetic means, periodically-actuated acoustical means, or thermal means, e.g., periodically heated bi-metallic elements.

According to further preferred features of the invention, the perturbation-producing element is driven by the active drive means at a predetermined frequency which is directly proportional to the velocity of the wing in the airstream, and inversely proportional to the length of the wing airfoil chord. Preferably, this element is driven at the following frequency (f):

$$f = F_C U/C$$

wherein "U" is the free stream velocity, "C" is the airfoil chord, and $F_C$ is the frequency coefficient defined in the above equation. The value of $F_C$ may vary from 0.5 to 3.0, with the preferred value determined to date being $F_C = 2$.

According to further preferred features, the width of the perturbation-producing element is 1-3% of that of the wing chord, and its amplitude of movement is in the order of 1% of the length of the wing airfoil chord.

The present invention is to be distinguished from the technique described by Wehrmann in U.S. Pat. No. 3,362,663 and by Lurz in U.S. Pat. No. 4,516,747. The technique in both of these patents relates to the problem produced by the transition to turbulence in a boundary layer next to a wing surface, and not to the problem of separation of the boundary layer from the wing surface, as in the present invention. Thus, in the above patents, sensors are provided to detect flow disturbances, and these sensors are used to apply perturbations to the boundary layer which are out of phase with, and will therefore cancel, the sensed perturbations. Thus, the technique described in both these patents requires real-time sensing and analysis of the fluctuations in the boundary layer, followed by transmitting the analyzed signal to a vibration transmitter which feeds back the desired fluctuations into the boundary layer. The method of the Lurz patent is thus based on producing the perturbations at a frequency sensed by the detector, and not at a predetermined frequency. The method of the present invention, however, is based on the producing of perturbations at a predetermined frequency, which is independent of the fluctuations existing locally in the flow, and requires neither real-time sensing of the fluctuations in the boundary layer, nor the production of fluctuations which cancel the sensed fluctuations.

The technique of the present invention is also to be distinguished from previously known techniques which aim to energize the boundary layer on a continuous basis, such as by blowing a jet next to the surface, or rotating a large cylinder or vane at the inner section of the wing and the flap. These techniques, which are extremely old going back to the beginning of this century, are usually too complex and heavy to be implemented in flight.

Another known technique is that described in Quinn U.S. Pat. No. 3,774,867, in which oscillations produced by the boundary layer are simply amplified by the addition of a -resonant cavity. This technique also does not involve actively driving a perturbation-producing element; and moreover the frequencies suggested are approximately two orders of magnitude higher than the frequency of the present invention.

While the present invention is particularly applicable for increasing lift of a wing, it may also be advantageously applied to other applications. Thus, a second embodiment of the invention is described below in which the solid surface is a diffuser for a fluid stream, the diffuser having an enlargement in area for slowing the flow and recovering pressure. This embodiment of the invention is effective to increase the permissible angle of the enlargement, in order to reduce the length of the diffuser or to increase its efficiency for a prescribed length.

Further features and advantages of the invention will be apparent from the description below.

BRIEF DESCRIPTION OF THE DRAWINGS

The invention is herein described, by way of example only, with reference to the accompanying drawings, wherein:

FIGS. 3, 4, 5a, 5b, 6, 7, 8, 9a, 9b, 10, 11, 12, 13, 14a, 14b, 14c, 14d and 14e set forth data obtained by testing a wing constructed in accordance with the present invention, thus:

DESCRIPTION OF PREFERRED EMBODIMENTS

Wing Construction (FIGS. 1 and 1a–1f)

Figure 1:
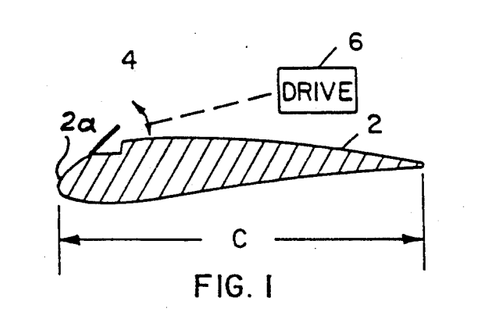
FIG. 1 illustrates a wing constructed in accordance with the present invention in order to increase the lift of the wing.
Figure 1A:
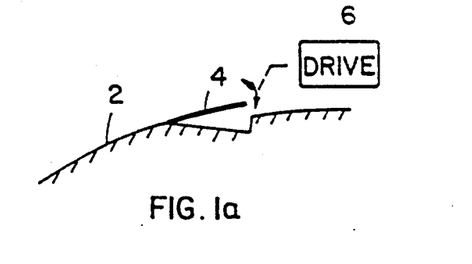
FIG. 1a is an enlarged fragmentary view of a portion of the wing of FIG. 1.

Illustrated in FIG. 1 is a wing 2 having a perturbation-producing element 4 in the vicinity of the leading edge 2a of the wing airfoil, and a drive 6 for driving element 4 to induce oscillations of the boundary layer in the airstream about an axis substantially perpendicular to the upper surface of the airfoil 2, to enhance mixing the boundary layer in the surrounding airstream. As described above, the entrainment of surrounding air in the vicinity of the airfoil is thus enhanced. Since the reservoir of available air is limited, as it is bounded by the airfoil surface on one hand and by the mixing layer on the other, the pressure in this reservoir is reduced by the removal of the entrained air, causing the mixing layer to bend towards the surface and to reattach to it. Such reattachment restores the lift generated by the airfoil thereby delaying the separation of the boundary layer from the wing. This permits increasing the wing angle of attack and thereby the lift without stall.

The parameters governing the maximum lift coefficient ($C_{Lmax}$) of a given airfoil are: the frequency coefficient ($F_C$) of the perturbation-producing element 4; the amplitude of its oscillations; the Reynolds Number ($R_e$) of the flow; the location of element 4 on the airfoil 2; and the geometry of the airfoil. The effects of most of these parameters on the lift and the drag generated by an airfoil are discussed below particularly with reference to FIGS. 14a–14e.

Preferably, the perturbation-producing element 4 is located within 15% of the wing airfoil chord "C" from its leading edge 2a, and is driven at a frequency which is directly proportional to the velocity (U) of the wing with respect to the airstream, and inversely proportional to the length of the wing airfoil chord (C). Element 4 is preferably driven at the following frequency (f):

$$f = F_C U / C$$

wherein "U" is the airstream velocity, "C" is the wing airfoil chord, and $F_C$ is a frequency coefficient having a value within the range of 0.5 to 3.0. Best results were obtained in the tests so far made when $F_C$ was about 2.0.

Element 4 substantially spans the entire wing. Its width is substantially smaller than that of the airfoil 2, and is preferably 1–3% of the airfoil chord C. The amplitude of movement of element 4 is preferably less than 3% of the length of the airfoil chord.

As one example, the perturbation-producing element 4 may be located about 10% of the length of the airfoil chord from its leading edge; and it may have a width of 1% of the airfoil chord and an amplitude of oscillation of the order of 1% of the airfoil chord.

The perturbation-producing element 4 may take a wide variety of forms, some of which are illustrated in FIGS. 1b–1e.

Figure 1B:
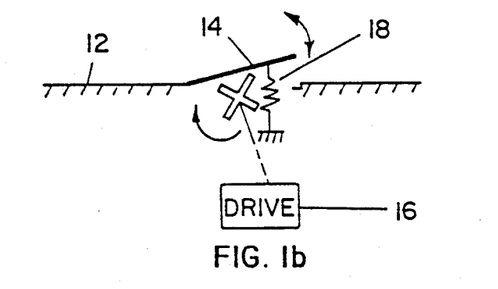
FIGS. 1b-1e are fragmentary views, corresponding to that of FIG. 1a, but illustrating other constructions of the perturbation-producing element on the wing.

FIG. 1b illustrates this element, therein designated 14, as mounted in the vicinity of the leading edge of the wing 12, and in the form of a pivotal flap oscillated by a cam 15 rotated by drive 16 against the force of a spring 18. Thus, spring 18 urges the flap towards the surface of the wing 12, and is driven in the opposite direction by rotating cam 15.

Figure 1C:
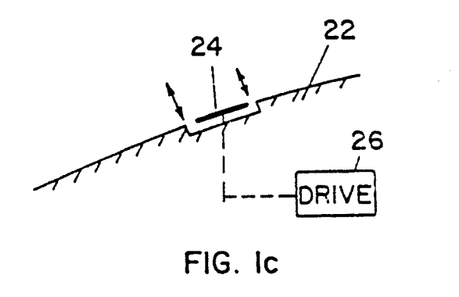
Figure 1D:
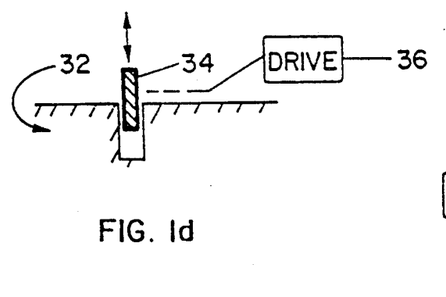
Figure 1E:
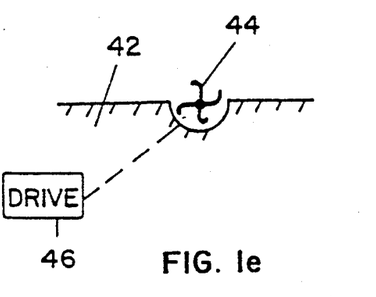

FIG. 1c illustrates an arrangement wherein the perturbation-producing element 24 is in the form of a plate or ribbon located substantially parallel to the surface of the wing 22 and reciprocated towards and away from the wing surface by drive 26. FIG. 1d illustrates an arrangement wherein this element 34 is in the form of an obstruction located substantially perpendicular to the upper surface of the wing 32 and reciprocated by a drive 36 in and out of a recess 38 formed in the wing surface. FIG. 1e illustrates an arrangement wherein this element 44 is in the form of a rotating vane projecting slightly above the upper surface of the wing 42 and rotated by a drive 46.

It is to be appreciated that the foregoing arrangements merely illustrate examples of perturbation-producing elements which may be used. Any of the constructions described in the above-cited U.S. Pat. No. 4,257,224 may also be used and are herein incorporated by reference. Other possible arrangements include injecting fluid jets by rotating nozzles, and oscillating a member magnetically, acoustically or thermally, e.g., by bi-metallic periodically heated elements.

Figure 1F:
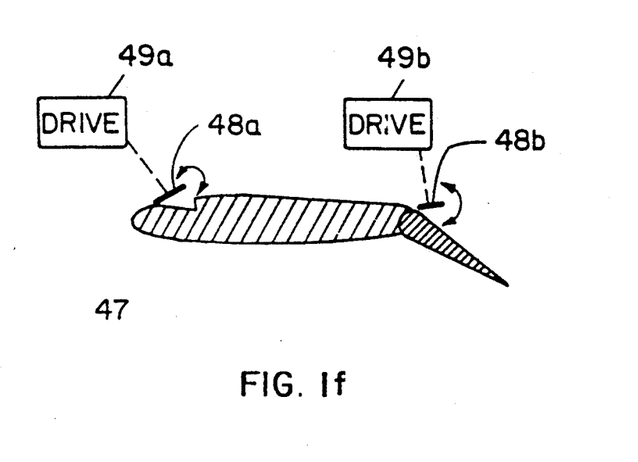
FIG. 1f illustrates a wing with two such elements in tandem.

FIG. 1f illustrates a further arrangement wherein the wing 47 is provided with two (or more) perturbation-producing elements 48a, 48b, arranged in tandem and each driven by a drive 49a, 49b to induce oscillations in the boundary layer. Thus, element 48a is located in the vicinity of the leading edge of the wing, whereas element 48b is located in tandem thereto closer to the trailing edge of the wing.

Figure 2:
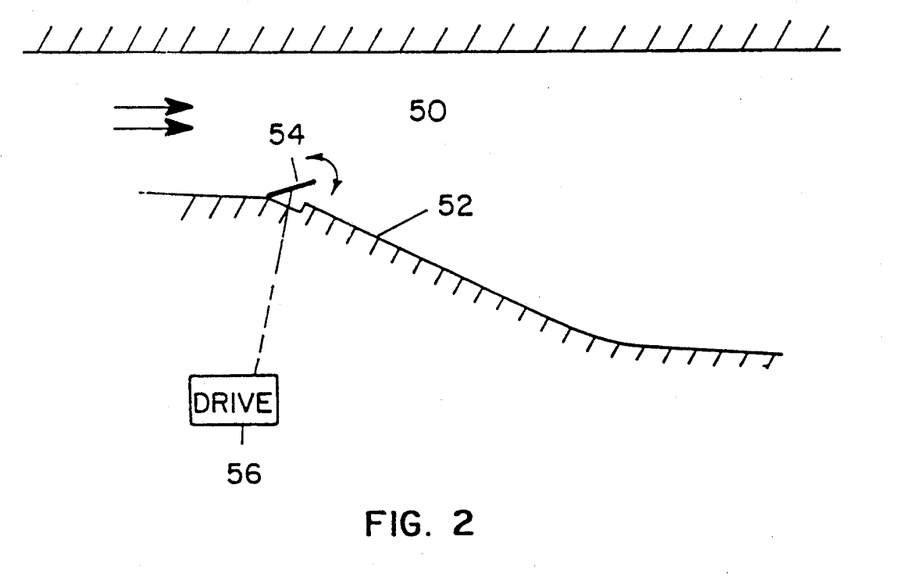
FIG. 2 illustrates a diffuser constructed in accordance with the present invention.

Diffuser Construction (FIG. 2)

As also indicated earlier, while the invention is especially useful with respect to wings, for delaying the separation of the boundary layer of the airstream flowing over the wing surface in order to increase lift, the invention can also be used in other applications for delaying the separation of a boundary layer flowing over a solid surface.

Thus, FIG. 2 illustrates the application of the invention to a diffuser 50 having an enlargement 52 in the cross-sectional area provided for slowing the fluid flow and recovering pressure. The diffuser is provided with a perturbation-producing element 54 at the leading edge of the enlargement 52, which element is driven by a drive 56 to induce oscillations of the boundary layer in the fluid stream about an axis substantially perpendicular to the inner surface of diffuser 50, and thereby to enhance the mixing of the boundary layer in the fluid stream. Such an arrangement enables a diffuser to be constructed of smaller dimensions, or enables a diffuser of specified dimensions to be constructed to operate more efficiently, than would otherwise be the case without the provision of the arrangement for enhancing the mixing of the boundary layer in the fluid stream.

TEST DATA

The experimental data illustrated in FIGS. 3–14e is particularly applicable to airfoils and shows how the above-described technique, for enhancing the mixing of the boundary layer in the airstream, delays the separation of the boundary layer to increase lift and to prevent stall:

Conditions of the Tests

The initial flow visualization experiments were carried out on a thin, uncambered airfoil having a sharp leading edge. The approximate Reynolds number based on the airfoil chord was only $5 \times 10^4$. The rate of spread of the boundary layer was controlled by the harmonic motion of a small ribbon (e.g., a pivotal flap (corresponding to element 4 in FIGS. 1 and 1a) hinged to the surface of the airfoil near its leading edge. Quantitative data were generated on a NACA-0015 airfoil with a modified trailing edge on a Worthmann FX63-137 airfoil, and on other airfoils at Reynolds numbers ranging from $0.5 \times 10^5$ to $6 \times 10^5$. The vibrating ribbons, in these experiments, were situated upstream of the anticipated static separation point corresponding to the onset of a deep stall. The airfoils were mounted on turntables which spanned the tunnel test section. The lift coefficient was determined by integrating the pressure distribution on the surface, while the drag coefficient was measured by traversing the wake. The tests were carried out in conventional wind tunnels, and therefore standard wind tunnel wall corrections had to be applied to the data.

Flow Visualization

Figure 3:
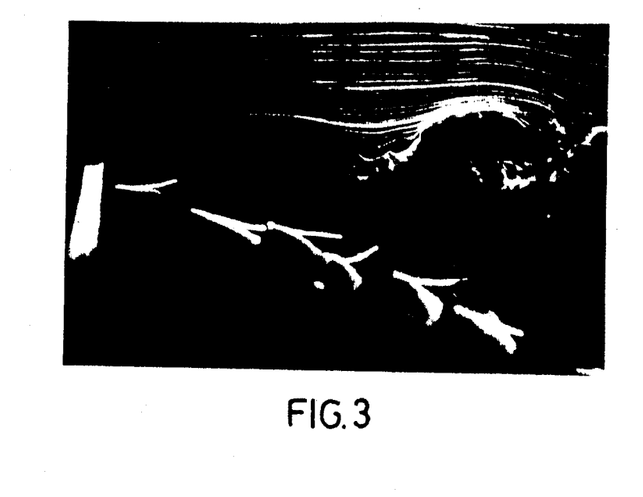
FIG. 3 illustrates the flow over a stalled airfoil at $\alpha = 19°$ (stationary ribbon is seen near the leading edge)
Figure 4:
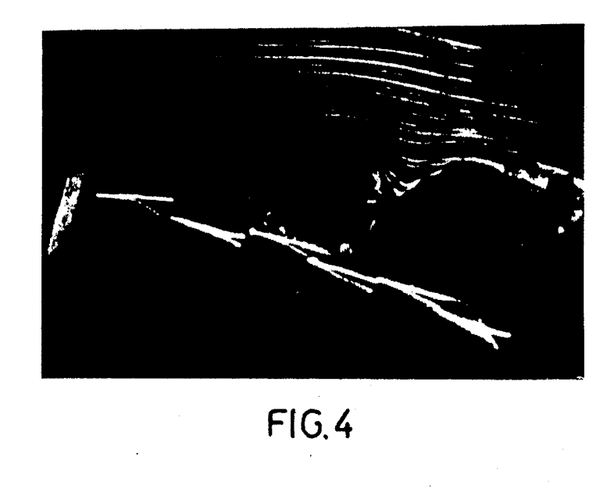
FIG. 4 illustrates the effect of the vibrating ribbon on the flow.

The flow over the sharp leading-edge airfoil, as shown in FIG. 3, is fully separated at an angle of incidence $(\alpha) = 19°$ when the ribbon, seen near the leading edge, is inactive. The smoke filaments visible above the upper surface of the airfoil are flowing in the direction of the undisturbed stream (i.e., they are not deflected downward), indicating that the airfoil does not impart any appreciable downward momentum to the fluid and thus generates little or no lift. The tufts placed on the upper surface provide, by oscillating vigorously in random directions, an additional indication that the flow is fully separated. When harmonic forcing is applied to the ribbon, the same tufts become attached to the surface, with the exception of the tuft adjacent to the trailing edge of the ribbon. Although the thickness of the mixing layer increases dramatically as a result of the excitation, the free stream above the airfoil is deflected downward at an average angle of 16°, which differs by approximately 3° from the angle of incidence on the airfoil itself (FIG. 4). The structure of the large eddies visible above the airfoil resembles the coherent structures observed in a plane mixing layer generated by two parallel streams of different velocities, in the absence of a pressure gradient and in the absence of a solid surface. The level of turbulence in the attached mixing layer ought to be high, as may be deduced from the diffused smoke in the core of the large eddies.

Figure 5A:
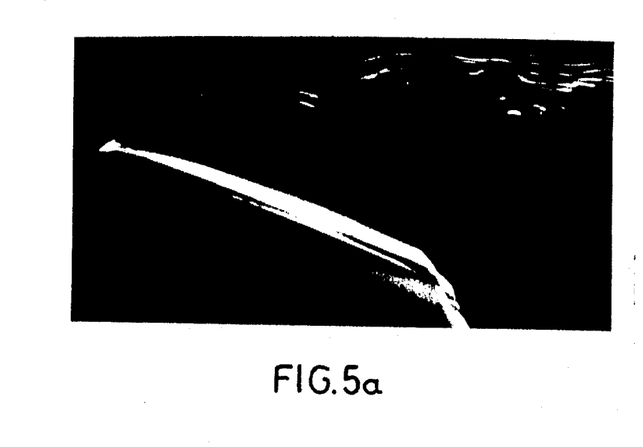
FIGS. 5a and 5b illustrate the effect of ribbon oscillations on the flow around a modified NACA-0015 airfoil at $\alpha = 16°$.
Figure 5B:
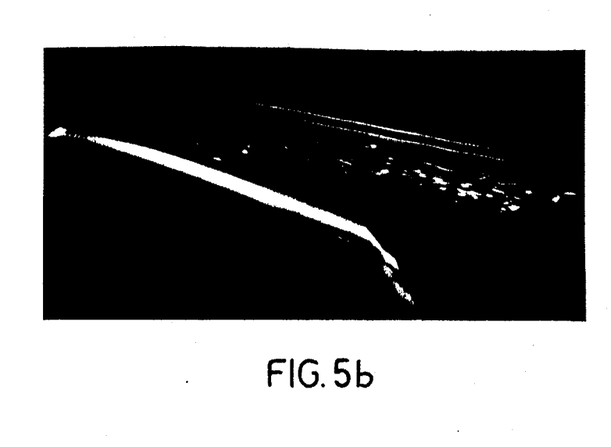

Similar observations, made on the modified NACA-0015 airfoil at an angle of incidence $(\alpha) = 16°$ and at $Re = 5 \times 10^4$, are shown in FIGS. 5a and 5b

Lift and Drag Characteristics of the Modified NACA-0015 Airfoil

Figure 6:
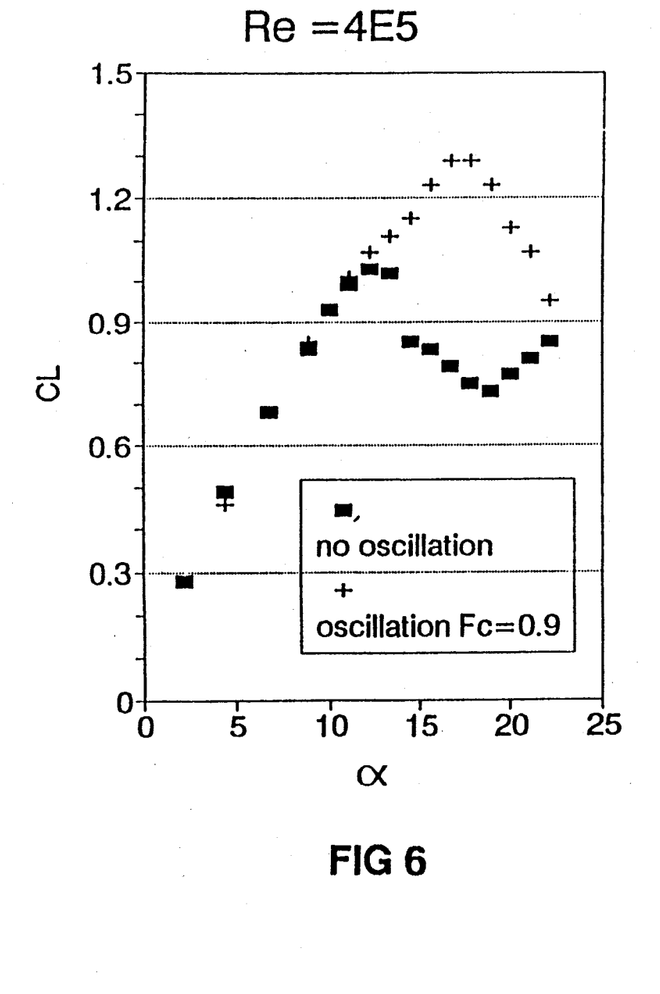
FIG. 6 illustrates the variation of $C_L$ with $\alpha$ for the modified NACA-0015 airfoil with and without the oscillations of the ribbon; $Re = 4 \times 10^5$; +—no oscillation; ■—ribbon oscillated at $f^+ = 0.9$; $St = fA/U = 2.95 \times 10^{-3}$.

The dependence of the lift coefficient on the angle of incidence, for $Re = 4 \times 10^5$ and $U = 20$ m/sec, is shown in FIG. 6. The slope $dC_L/d\alpha$ is almost a constant for $\alpha < 10°$, regardless of whether the ribbon was oscillating or not. In the absence of external excitation, the airfoil stalled at $11° < \alpha < 12°$, giving a maximum value of $C_L = 1.04$. Oscillating the ribbon at an amplitude of 1 mm at a Frequency Coefficient $(F_C) = 0.9$ delayed the stall to $15° < \alpha < 16°$ and enabled the airfoil to generate a maximum Lift Coefficient $(C_L)_{max} = 1.33$. The dependence of $C_L$ on $\alpha$ remained virtually linear between $\alpha = 10°$ and $15°$.

Figure 7:
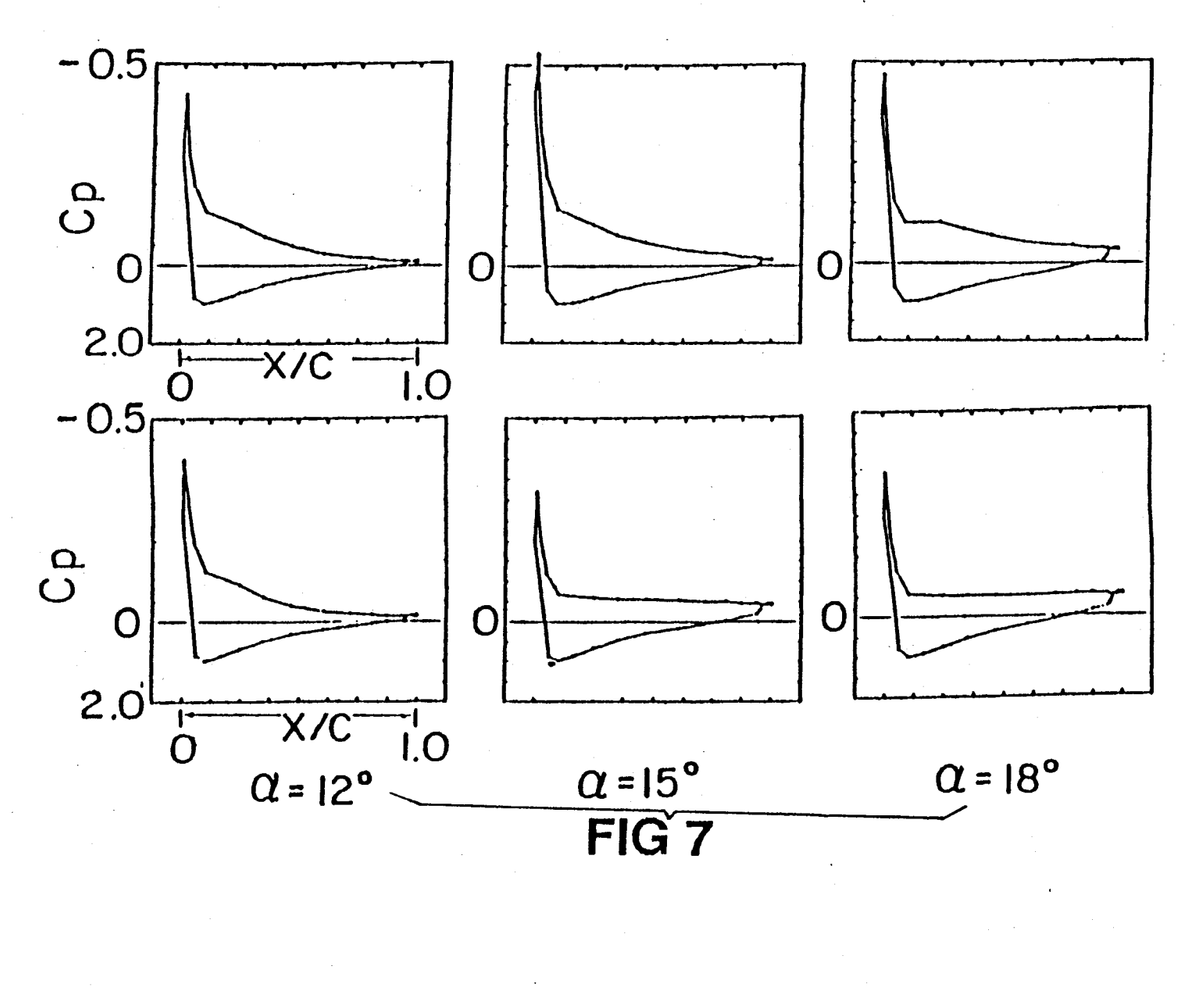
FIG. 7 illustrates a comparison of the pressure distribution over the modified NACA-0015 airfoil with and without the oscillations of the ribbon; $\alpha = 12°, 15°, 18°$; $f^+ = 0.9$; $St = 2.95 \times 10^{-3}$.

The pressure distributions measured at $\alpha = 12°$ for the above-mentioned forced and unforced situations were almost identical (FIG. 7). At $\alpha = 15°$, however, the airfoil stalls in the absence of excitation, as may be deduced from the constant pressure coefficient observed on the upper surface. The low pressure coefficients and the adverse pressure gradient on the upper surface are recovered by forcing the ribbon to oscillate. At $\alpha = 18°$, the forced oscillations at a displacement amplitude of 1 mm and $F_C = 0.9$ cannot prevent a leading-edge bubble, which extends from $x/c = 0.1$ to $x/c = 0.25$. Thereafter, the flow reattaches to the surface as a result of the amplification of the oscillations in the free shear layer which enabled it to negotiate the large adverse pressure gradient farther downstream. The local separation and reattachment resulted in a loss of lift equivalent to 15% of $(C_L)_{max}$.

Figure 8:
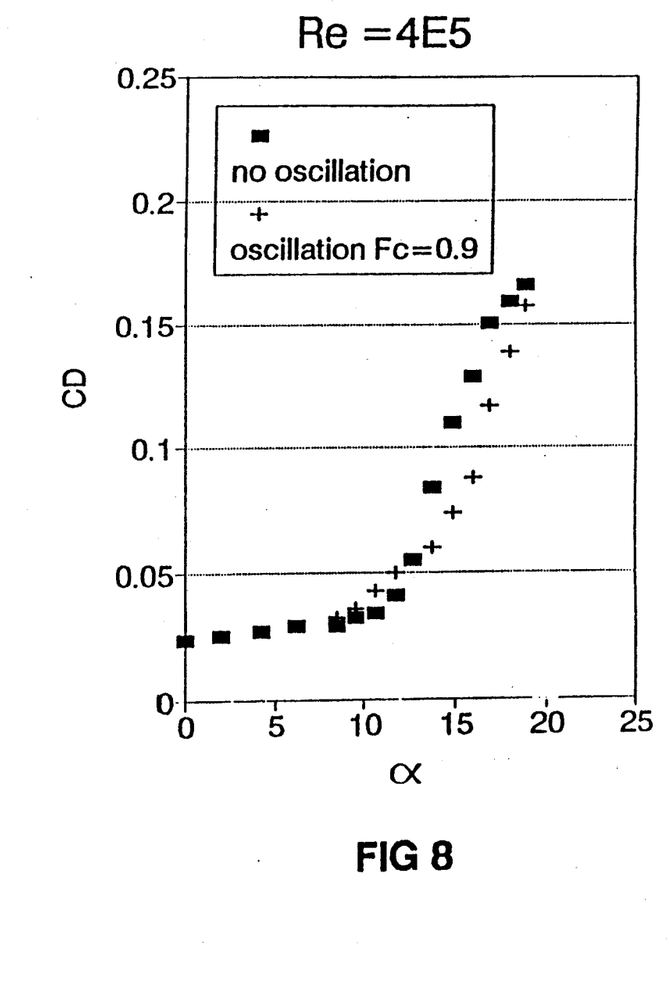
FIG. 8 illustrates the variation of $C_D$ with $\alpha$ for the modified NACA-0015 airfoil with conditions identical to those shown in FIG. 6.

The measured drag coefficient, shown in FIG. 8, is independent of the excitation provided $\alpha < 7°$. For $8° < \alpha < 12°$, the drag of this airfoil in the absence of forcing is somewhat lower than it is with the ribbon operational; this may be attributed to a higher level of turbulence caused by the imposed oscillations, which presumably results in an earlier transition of the boundary layer. The drag coefficient measured between $\alpha = 10°$ and $\alpha = 18°$, with the ribbon oscillating, is always smaller than the drag coefficient measured with the ribbon stationary; the largest difference occurs at $\alpha = 15°$, which amounts to a 33% reduction in the $C_D$ as a result of the excitation. At this angle of attack, the flow is fully attached in one case and completely separated in another. There are no significant differences at $\alpha > 18°$ since the flow is separated irrespective of the oscillations of the ribbon at the particular amplitude chosen.

An attempt was made to explore the dependence of $C_L$ (Lift Coefficient) on $F_C$ (Frequency Coefficient) and on the displacement amplitude of the ribbon. The displacement of the ribbon was chosen to be maintained at a constant value because of the ease at which it was observed. At a later stage of the experiment (FIG. 14a-c), the actual induced velocity was measured. Stroboscopic illumination which was phase locked to the motion of the ribbon was sufficient to monitor the amplitude and the spanwise uniformity of the oscillation. Since the ribbon oscillated in a harmonic motion described by:

$$Y_r = A \sin(\omega t),$$

it was believed that the velocity perturbation imparted to the flow is linearly related to the velocity at the trailing edge of the ribbon and may be described by:

$$V_r = KA\omega \cos(\omega t),$$

where A is a proportionality constant to be determined experimentally. This is not exactly the case because the flap oscillates in a boundary layer.

Figure 9A:
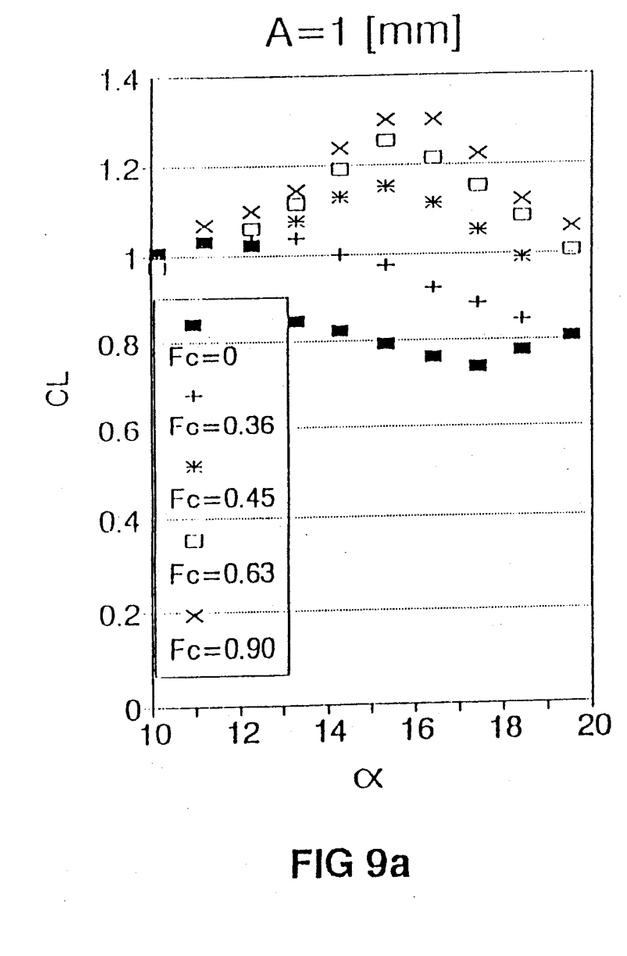
FIGS. 9a and 9b illustrate the dependence of $C_L$ on $\alpha$ for different frequencies of forcing on the modified NACA-0015 airfoil at $Re = 4 \times 10^5$.
Figure 9B:
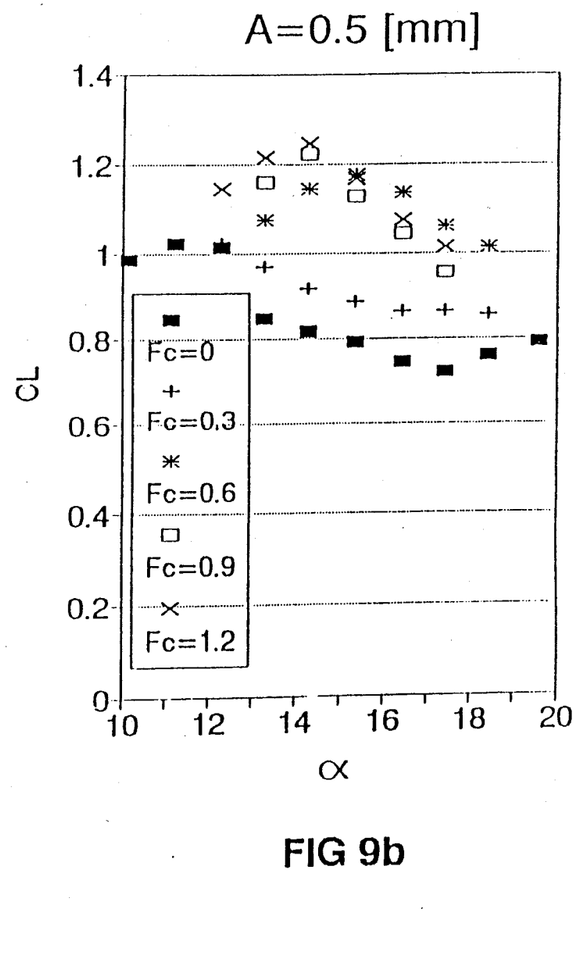

The dependence of $C_L$ on $\alpha$ and $F_C$ is shown in FIGS. 9a and 9b. The Reynolds number (Re) and the displacement amplitude of the ribbon, A, was maintained constant throughout these experiments. The data shown in FIG. 9a correspond to a displacement $A = 1$ mm, while the data shown in FIG. 9b represent $A = 0.5$ mm. The triangular symbols in both figures correspond to the $C_L$ obtained with the ribbon being stationary. For $\alpha < 11°$, the value of $C_L$ was not affected by the ribbon, regardless of the frequency and the amplitude of the oscillation. In both instances, the maximum value of $C_L$ increased with increasing $F_C$. The oscillators used in the initial experiments were too weak to maintain the prescribed amplitude at higher frequencies, and therefore the eventual reduction in $(C_L)_{max}$ was not observed in FIG. 9. The angle of incidence beyond which the airfoil stalled increased with $F_C$, while A was maintained constant. For example, for A = 1 mm (FIG. 9a),

| $F_C$ | $\alpha$ Corresponding to $(C_L)_{max}$ |
|---|---|
| 0.00 | 11°–12° |
| 0.36 | 12°–13° |
| 0.45 | 15° |
| 0.90 | 15°–16° |

The value of $\alpha$ at which $C_L$ was maximum hardly changed in this case provided $F_C > 0.45$. Similar deduction can be made for A=0.5 mm. As shown in FIG. 9b, increasing the frequency of the oscillations while decreasing their amplitude generated similar values of $(C_L)_{max}$. Plotting the maximum value of the lift coefficient attained versus the Strouhal number comprising [$A\omega/U$] suggested that the relationship between these parameters is by no means simple (FIG. 10a), thus the sinusoidal velocity perturbations, rather than the displacement amplitude of the flap, have to be maintained constant. In later experiments these conditions were maintained and the data is presented in FIGS. 14a–14e.

Lift and Drag Characteristics of the Wortmann FX63-137 Airfoil

The Wortmann FX63-137 airfoil was especially developed for high-performance gliders, and its characteristics at Re lower than $5 \times 10^5$ are well documented. It is also considered one of the best airfoil sections available for low-speed applications as its combination of camber and thickness enables a laminar separation bubble to reattach over a fairly broad range of angles of attack. The lift coefficient on this airfoil, however, exhibits a strong hysteresis in its recovery from stall, resulting in severe control problems. For example, if a typical inception of a stall at a prescribed Re occurs at $\alpha = 18°$, the recovery from stall may occur at $\alpha = 10°$. The difference between the two angles may depend on the smoothness of the surface, the Reynolds number, the noise level and its predominant frequency band, as well as the turbulence level in the free stream. The $(C_L)_{max}$ attained is approximately 1.6, dropping to $C_L = 1$ after the inception of a stall.

Figure 10:
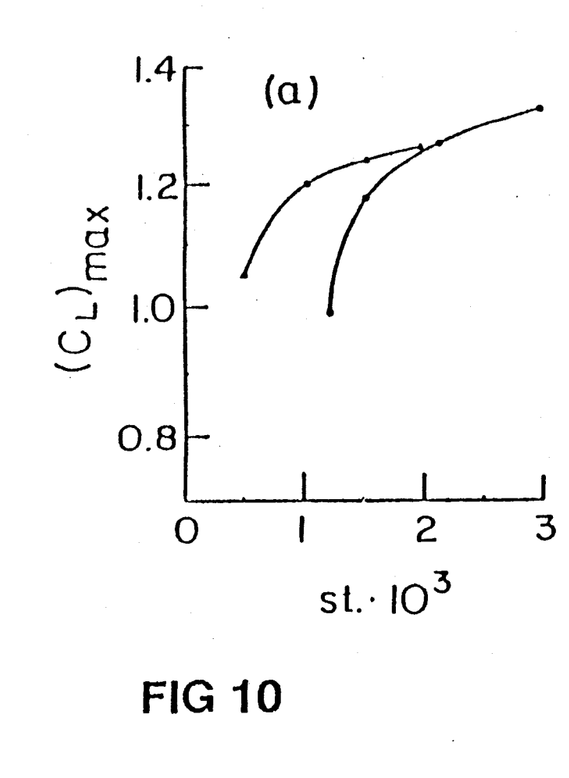
FIG. 10 illustrates the plot of $(C_L)MAX$ versus $St = Af/u$.
Figure 11:
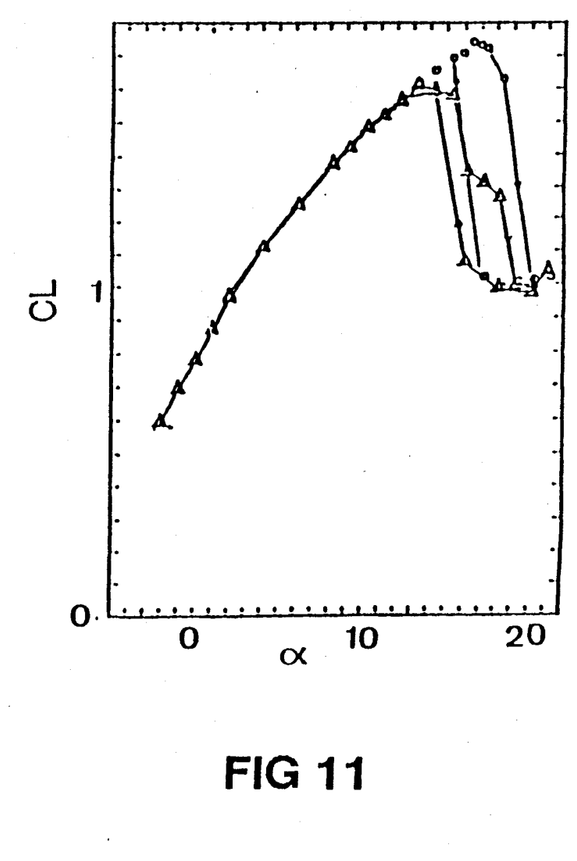
FIG. 11 illustrates the dependence of $C_L$ on $\alpha$ for the FX63-137 airfoil at $Re = 2 \times 10^5$. △—ribbon stationary; o-$f = 0.9$, $St = 3 \times 10^{-3}$.

The observations described above were made at Re $=2 \times 10^5$ with a small ribbon whose chord was less than 2% of the airfoil chord mounted on the upper surface at x/c=0.10. The ribbon was placed at this x/c because a laminar separation bubble originated at this location on the clean airfoil (i.e., in the absence of the ribbon) at $\alpha = 15°$. The inactive ribbon, whose trailing edge was held at a distance of 0.5 mm above the upper surface of the airfoil, in order to permit symmetrical oscillations about this neutral location, acted as a two-dimensional tripping device, changing somewhat the characteristics of the airfoil. The unforced data presented in FIG. 11 refer to this configuration and, therfore, the stall hysteresis loop is significantly narrower in terms of $\Delta\alpha$ than for the clean airfoil. By vibrating the ribbon at A = 1 mm at $F_C = 0.9$, the maximum lift coefficient increased from 1.6 to 1.75 and the angle of stall was delayed by aproximately 3° (FIG. 10).

Figure 12:
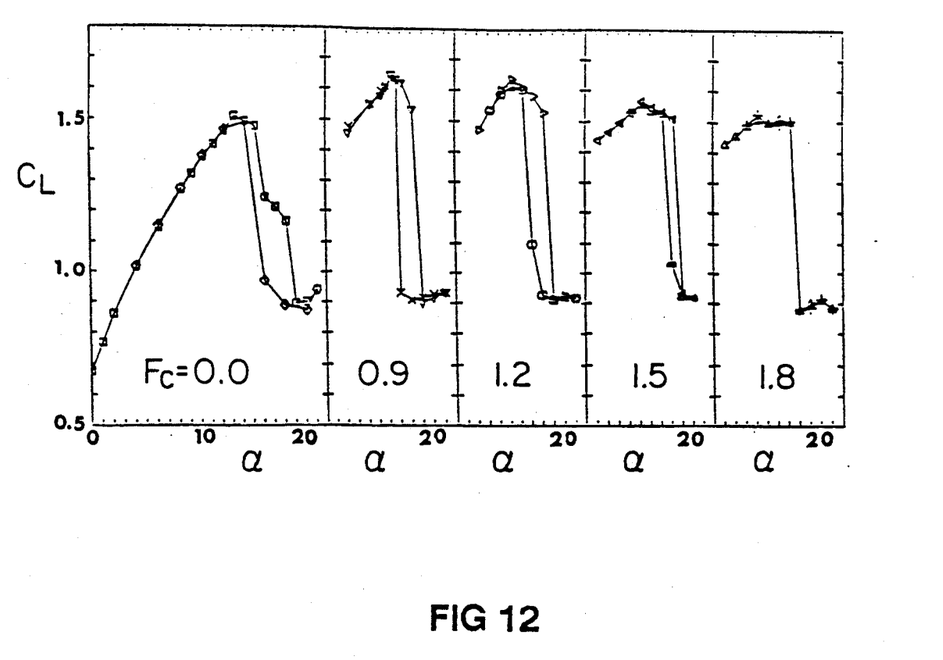
FIG. 12 illustrates the variation of $C_L$ with $\alpha$ for the FX63-137 airfoil at $Re = 2 \times 10^5$ showing stall hysteresis. (a) $f^+ = 0$, (b)$f^+ = 1.2$, (c) $f^+ = 1.5$, (d) $f^+ = 1.8$.

The width of the hysteresis loop was narrowed when the frequency of the excitation was increased while the displacement amplitude of the vibrating ribbon was maintained at 1 mm (FIG. 12). At $F_C = 1.8$, the hysteresis loop was entirely eliminated, enabling the airfoil to stall and to recover from stall at an identical angle of attack ($17° < \alpha_{stall} < 18°$). Although the value of $(C_L)_{max}$ measured at $F_C = 1.8$ was almost identical to the value measured in the absence of forcing, the range of angles at which the lift coefficient remained close to $(C_L)_{max}$ doubled when compared with the unforced case.

Figure 13:
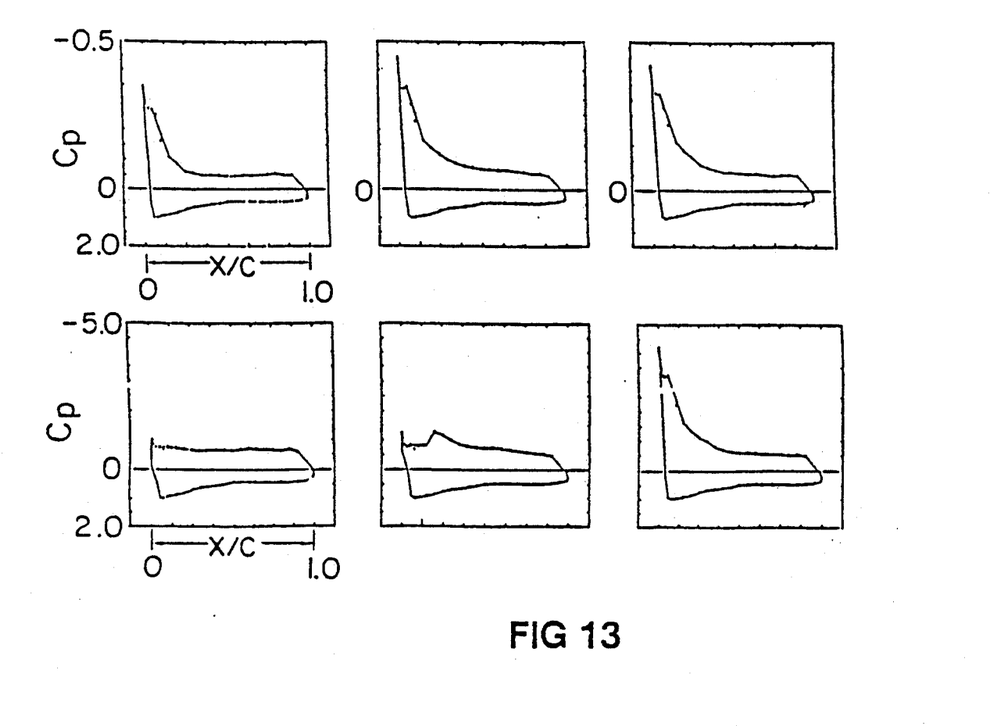
FIG. 13 illustrates the pressure distribution on the FX63-137 airfoil at $\alpha = 17°$ and $f^+ = 0$, 1.2, and 1.8; top row corresponds to stall inception, bottom to stall recovery.

The pressure distribution corresponding to $\alpha = 17°$ is shown in FIG. 13. In the absence of forcing, the airfoil is on the verge of a deep stall, having a constant pressure coefficient over 80% of its chord. The pressure distribution does not show any indication of recovery when the angle of incidence is reduced from $\alpha$ corresponding to a deep stall to $\alpha = 17°$. By activating the ribbon at $F_C = 1.2$, the hysteresis loop is narrower and the pressure distribution shows signs of recovery at $\alpha = 17°$. Nevertheless, the imposed oscillations could not reestablish the steep pressure gradient near the leading edge of the airfoil. The pressure distributions corresponding to $\alpha = 17°$ and $F_C = 1.8$ are identical whether or not the angle of incidence was decreasing or increasing, even though the measurements were not made on the fly (i.e., $\alpha$ remained constant throughout the process of data acquisition).

Effect of Various Parameter on Maximum Lift Coefficient

As indicated earlier, the maximum lift coefficient is affected by a number of parameters, including: the frequency coefficient ($F_C$) of the perturbation-producing device; the amplitude of the velocity oxcillation introduced into the boundary layer the Reynolds Number (Re) of the flow; the location of the device on the airfoil; and the geometry of the airfoil. The effect of most of these parameters on the lift and the drag generated by an airfoil are illustrated in FIGS. 14a–14e.

Figure 14A:
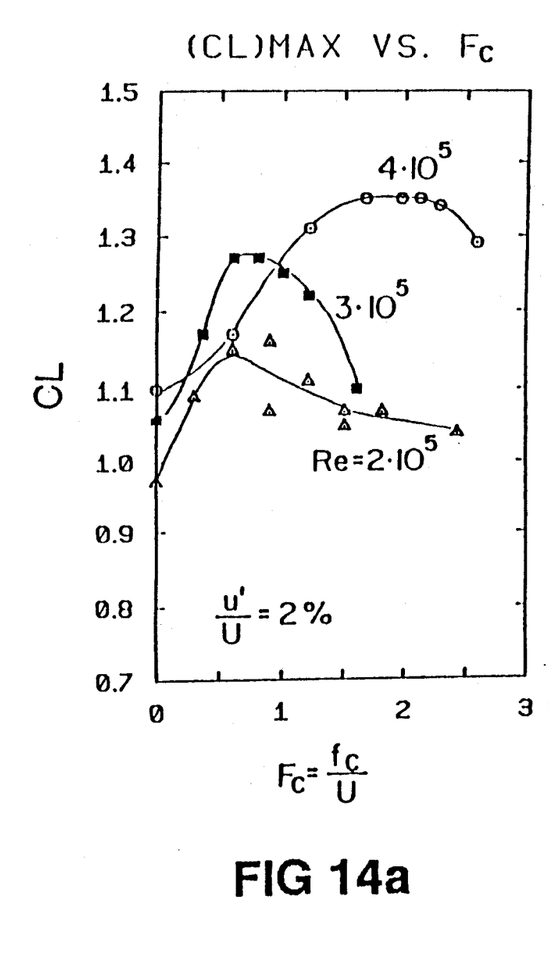
FIG. 14a–14e illustrate effects of various parameters on the lift and drag generated by an airfoil.

FIG. 14a illustrates how the maximum lift coefficient $(C_L)_{max}$ varies with the frequency coefficient ($F_C$). Thus, by keeping constant the Reynolds Number (Re), and the amplitude of the induced fluctuations $u'/U=2\%$, not the amplitude of the flap displacement measured earlier, the maximum attainable lift coefficient occurred at a frequency coefficient ($F_C$) of approximately 2. The increase in Re increased the effectiveness of the device, as did the increase in the amplitude of the oscillation. Thus, it can be shown that the maximum lift coefficient can easily be increased by some 40%, using a tiny oscillating flap having a length equal to 1% of the airfoil chord, and oscillating at an amplitude equivalent to less than 10% of its length, i.e., of the order of 0.1% of the airfoil chord dimension.

Figure 14B:
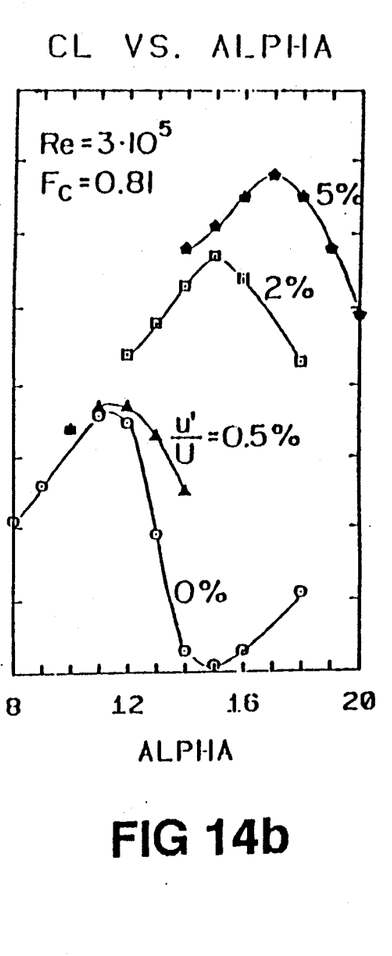
Figure 14C:
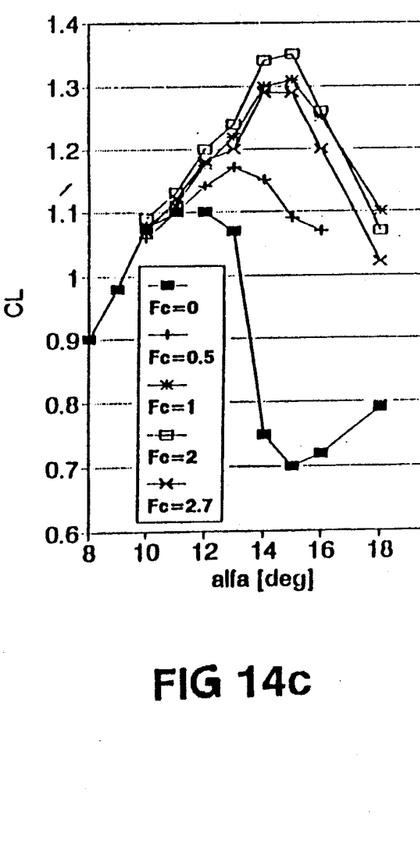
Figure 14D:
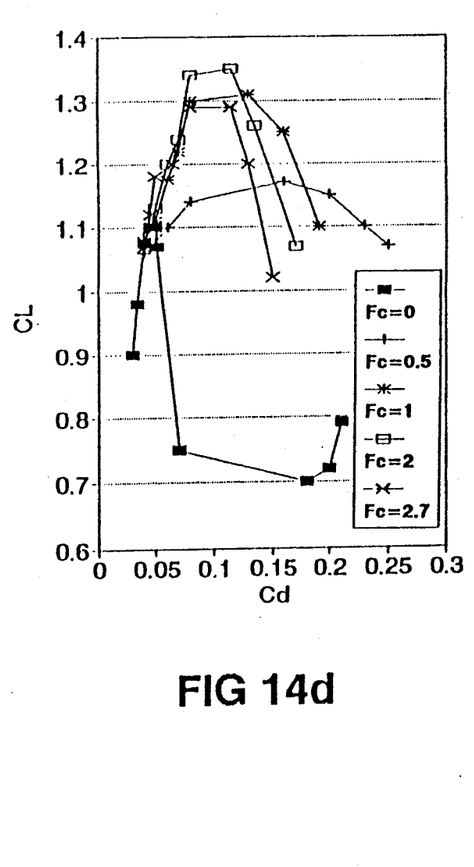
Figure 14E:
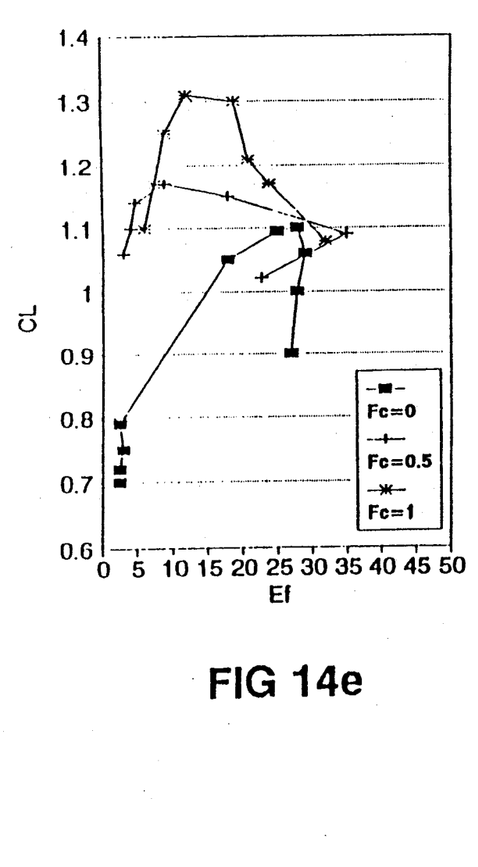

FIG. 14b illustrates how the lift coefficient ($C_L$) increases with the angle of attack ($\alpha$) for different amplitudes of oscillations of the perturbation-producing element, wherein it will be seen that the lift coefficient increases with an increase in the amplitude at a prescribed Re and $F_C$. FIG. 14c illustrates the manner in which the lift coefficient increases with an increase in the angle of attack for different frequency coefficients ($F_C$), maximum lift being obtainable wherein $F_C = 2$. FIG. 14d illustrates the manner in which the lift coefficient ($C_L$) varies with the drag coefficient ($C_D$), and FIG. 14e illustrates the manner in which the lift coefficient ($C_L$) varies with the endurance factor ($E_f$), which is equal to $C_L^{3/2}/C_D$.

Since the maximum lift coefficient occurs at a prescribed angle of attack, the angle of attack indicator may be used to activate the device in both amplitude and frequency for optimal performance. This simple device is installed on most airplanes (alternately, an airspeed indicator may be used), and there is no need for any type of sensor which processes information in real-time. The device may increase the effectiveness of flaps, supplement them, and at times replace them altogether. This enables a substantial increase in the useful payload by eliminating the cumbersome and heavy mechanism and actuators associated with flaps. Furthermore, at low frequency coefficients ($F_C=0.61$) even the ratio of the lift to drag coefficient increases, although the increase in the maximum lift is relatively small (of the order of 10%).

While the invention has been described with respect to several preferred embodiments, it will be appreciated that these are set forth purely for purposes of example, and that many other variations, modifications and applications of the invention may be made.

What is claimed is:

1. An active method of delaying the separation of the flow from a solid surface to higher angles of divergence or incidence characterized in that a perturbation-producing element on the solid surface is driven by an active drive at a predetermined frequency dependent on the air stream velocity but independent of the fluctuations existing locally in the flow, to induce travelling oscillations in the boundary layer of the fluid stream substantially perpendicular to the solid surface to enhance mixing of the boundary layer with the fluid stream outside the boundary layer.

2. The method according to claim 1, wherein said solid surface is a wing moving in an airstream, and said perturbation-producing element is located in the vicinity of the leading edge of the wing and is effective to increase the maximum angle of attack, and thereby the lift, of the wing with respect to the airstream.

3. The method according to claim 2, wherein said predetermined frequency at which the perturbation-producing element is driven by said active drive is directly proportional to the velocity of the wing in the airstream.

4. The method according to claim 2, wherein said predetermined frequency at which the perturbation-producing element is driven by said active drive is inversely proportional to the length of the wing airfoil chord.

5. The method according to claim 2, wherein said predetermined frequency (f) at which the perturbation-producing element is driven by said active drive is predetermined according to the following relationship:

$$f = F_C U/C$$

wherein "U" is the airstream velocity, "C" is the wing airfoil chord, and "$F_C$" is a frequency coefficient within the range of 0.5 to 3.0.

6. The method according to claim 5, wherein $F_C$ is about 2.0.

7. The method according to claim 2, wherein the length of the perturbation-producing element is substantially equal to the span of the wing, and its width is 0.5–3% of the wing airfoil chord.

8. The method according to claim 2, wherein the amplitude of movement of the perturbation-producing element is in the order of 1% of the length of the wing airfoil chord.

9. The method according to claim 2, wherein the wing includes a plurality of perturbation-producing elements in tandem.

10. The method according to claim 1, wherein the solid surface is a diffuser for a fluid stream, said diffuser having an enlargement thereon for slowing the flow and recovering pressure, the perturbation-producing element being located at the beginning of said enlargement and effective to increase the permissible divergence angle of said enlargement.

11. The method according to claim 1, wherein said perturbation-producing element is a pivotal flap.

12. The method according to claim 1, wherein said perturbation-producing element is a ribbon located substantially parallel to the surface of the solid surface and is reciprocated towards and away from the solid surface.

13. The method according to claim 1, wherein said perturbation-producing element is an obstruction located substantially perpendicular to the solid surface and is reciprocated in and out of a recess formed in the solid surface.

14. Apparatus including a solid surface disposed within a fluid stream, characterized in that said apparatus includes a perturbation-producing element in the vicinity of the leading edge of said solid surface, and active drive means for driving said perturbation-producing element at a predetermined frequency, dependent on the air stream velocity but independent of the fluctuations existing locally in the flow, to induce travelling oscillations of the boundary layer of the fluid stream substantially perpendicular to said solid surface to enhance mixing of the boundary layer of the fluid stream, and thereby to delay the separation of said boundary layer from the solid surface.

15. The apparatus according to claim 14, wherein the solid surface is on a wing movable through an airstream, and said perturbation-producing element is located in the vicinity of the leading edge of the wing and is effective to increase the maximum angle of attack, and thereby the lift, of the wing with respect to the airstream.

16. The wing according to claim 15, wherein said predetermined frequency at which the perturbation-producing element is driven by said active drive is directly proportional to the velocity of the wing in the airstream and inversely proportional to the length of the wing airfoil chord.

17. The wing according to claim 16, wherein said predetermined frequency (f) at which the perturbation-producing element is driven is predetermined according to the following relationship:

$$f = F_C U/C$$

wherein "U" is the airstream velocity, "C" is the wing airfoil chord, and "$F_C$" is a frequency coefficient within the range of 0.5 to 3.0.

18. The wing according to claim 15, wherein the chord of the perturbation-producing element is 1–3% of that of the wing airfoil chord, and the amplitude of movement of the perturbation-producing element is in the order of 1% of the length of the wing airfoil chord.

19. The wing according to claim 15, wherein the wing has a plurality of perturbation-producing elements in tandem.

20. Apparatus according to claim 14, wherein the device is a diffuser having an enlargement therein for slowing the fluid flow and recovering pressure, said perturbation-producing element being located at the beginning of said enlargement and being effective to enhance mixing of the boundary layer in the fluid and thereby to increase the permissible angle of divergence of said enlargement.

* * * * *